Patented Sept. 8, 1936

2,053,343

UNITED STATES PATENT OFFICE 2,053,343

ANTHRAQUINONE DYESTUFFS

Frank Lodge and Henry Alfred Piggott, Blackley, Manchester, England, assignors to Imperial Chemical Industries Limited, a corporation of Great Britain No Drawing. Application November 30, 1934, Serial No. 755,512. In Great Britain December 6, 1933

7 Claims. (Cl. 260—59)

According to this invention, we manufacture new anthraquinone dyestuffs for acetate artificial silk by interacting a 1-aminoanthraquinone-2-sulphonic acid substituted in the 4-position by an amino, alkylamino, anilino or toluidino group, with a condensation product of ethylene oxide and a hydroxy compound as defined below.

Also according to this invention, we use the new dyes for dyeing and printing acetate artificial silk on which they show good fastness to washing.

By a condensation product of ethylene oxide and a hydroxy compound we mean monomethylglycol, monoethylglycol, glycol hydroxyethyl ether, glycerol trihydroxyethyl ether or other compound containing the group

—CH₂.(OCH₂.CH₂)ₙOH where $n$ is a whole number, and where two or more such groups may be present. We include also the highly soluble condensation products obtained or obtainable by submitting ethylene oxide either alone or with a hydroxy body, to heat and/or a catalyst adapted to facilitate or initiate condensation, such as sodium hydroxide or a tertiary organic base. Typical examples of such highly soluble condensation products are those prepared by heating mannitol with more than 6 molecular proportions of ethylene oxide, or by condensing ethylene oxide with carbohydrates such as glucose or fructose. These condensation products are believed to have constitutions coming within the definition given, see for example H. Staudinger, Die Hochmolecular organischen Verbindugen-Kautschuk und Cellulose, Berlin, 1932, page 278, et seq., but we do not make the inclusion of them in our invention subject to the correctness of constitution given.

In carrying the invention into practical effect, the manufacture of the dyes may be effected by heating the reagents in presence of a base, e. g. in aqueous alkaline medium, or, alternatively, the anthraquinonesulphonic acids or their alkali salts may be heated with an alkali metal derivative of the said hydroxyl compound either alone or in presence of an inert medium. The dyes may be applied by the known processes for applying aminoanthraquinones to acetate artificial silk.

The following examples in which parts are by weight illustrate but do not limit the invention.

*Example 1.*—100 parts of sodium-1-amino-4-anilinoanthraquinone-2-sulphonate, 400 parts of polyethylene glycol (prepared by heating 2 parts of ethylene glycol, 10 parts of stearamide and 106 parts of ethylene oxide in a closed vessel at 120–130° until the internal pressure falls to zero, and extracting the unchanged stearamide from the product with light petroleum) and 250 parts of 32% aqueous sodium hydroxide solution are stirred at 100° C. for 1 hour. The reaction mass is diluted with 2000 parts of water and the dyestuff precipitated by acidifying with hydrochloric acid. The precipitate is filtered off and washed well with cold water.

The product when dry is violet with a bronzy reflex; it dissolves with a bluish red colour in concentrated sulphuric acid and with a violet colour in alcohol. It may be used to dye acetate artificial silk in violet shades.

*Example 2.*—100 parts of sodium-1-amino-4-anilinoanthraquinone-2-sulphonate, 300 parts of glycerol tri(hydroxyethyl) ether (prepared by heating glycerol with 3 molecular proportions of ethylene oxide in a closed pressure-resisting vessel at 150° C.) and 150 parts of 32% aqueous sodium hydroxide solution are stirred and heated at 100° C. for 1 hour. The dyestuff is isolated from the reaction mass as in Example 1.

The dry product is violet with a bronzy reflex, it dissolves with a bluish red colour in concentrated sulphuric acid. It may be used to dye acetate artificial silk in violet shades.

*Example 3.*—The polyethylene glycol used in Example 1 is replaced by an equal weight of the condensation product obtained by heating mannitol with 30 molecular proportions of ethylene oxide in the presence of stearamide or an alkaline catalyst.

The product is violet, it dissolves in concentrated sulphuric acid with a bluish red colour and in alcohol with a violet colour. It dyes acetate artificial silk in violet shades. A similar product is obtained by substituting sorbitol for mannitol.

*Example 4.*—Instead of the sodium-1-amino-4-anilinoanthraquinone-2-sulphonate of Example 2 there is used an equal weight of sodium 1,4-diaminoanthraquinone-2-sulphonate. The product is isolated as in Example 1.

The so-obtained dyestuff when dry has a dark red bronzy colour, and dissolves in concentrated sulphuric acid with an orange colour. It dyes acetate artificial silk in bluish red shades.

*Example 5.*—Instead of the sodium 1,4-diaminoanthraquinone-2-sulphonate of Example 4 there is used sodium 1-amino-4-methylaminoanthraquinone-2-sulphonate. The product is isolated in the usual way.

The so-obtained dyestuff is a dark substance which dyes acetate artificial silk in reddish-violet shades.

We claim:

1. Process for the manufacture of new anthraquinone dyestuffs for cellulose ester or ether materials which comprises the interaction of a compound of formula:

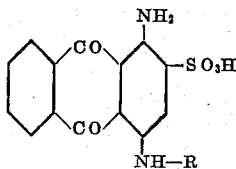

wherein R represents a member of the group consisting of hydrogen, alkyl, phenyl and tolyl in alkaline medium, with the condensation product of ethylene oxide and a polyhydric aliphatic alcohol.

2. Process for the manufacture of new anthraquinone dyestuffs for cellulose ester or ether materials which comprises the interaction of a compound of formula:

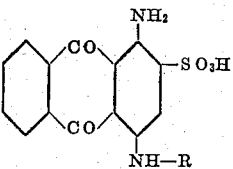

wherein R represents a member of the group consisting of hydrogen, alkyl, phenyl and tolyl in alkaline medium, with the condensation product of ethylene oxide and a polyhydroxy alcohol compound of the aliphatic series.

3. Process for the manufacture of new anthraquinone dyestuffs for cellulose ester or ether materials which comprises the interaction of a compound of formula

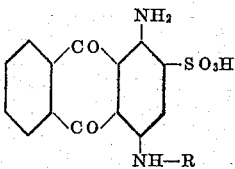

wherein R represents a member of the group consisting of hydrogen, alkyl, phenyl and tolyl in alkaline medium, with the condensation product of ethylene oxide and ethylene glycol.

4. Process for the manufacture of new anthraquinone dyestuffs for cellulose ester or ether materials which comprises the interaction of a compound of formula:

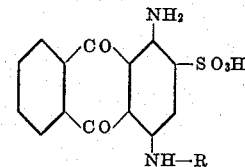

wherein R represents a member of the group consisting of hydrogen, alkyl, phenyl and tolyl in alkaline medium, with the condensation product of ethylene oxide and glycerol.

5. Process for the manufacture of new anthraquinone dyestuffs for cellulose ester or ether materials which comprises the interaction of a compound of formula:

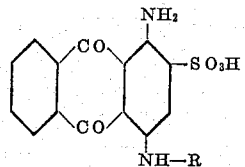

wherein R represents a member of the group consisting of hydrogen, alkyl, phenyl and tolyl in alkaline medium, with the condensation product of ethylene oxide and a compound of the sugar group.

6. A new anthraquinone dyestuff being the reaction product of a 1-amino-anthraquinone-2-sulphonic acid, carrying in position 4 a substituent chosen from the group consisting of amino, alkylamino, anilino and toluidino, and a β-hydroxyethyl ether of an aliphatic alcohol.

7. An anthraquinone dyestuff whch is the reaction product of 1-amino-4-anilino-anthraquinone-2-sodium sulfonate and glycerol tri-(hydroxy ethyl) ether which when in dry form is violet in color, dissolving in concentrated sulfuric acid with a bluish-red color, and which dyes cellulose acetate silk in violet shades.

FRANK LODGE.
HENRY ALFRED PIGGOTT.